US010192517B2

(12) United States Patent
Ballestad et al.

(10) Patent No.: US 10,192,517 B2
(45) Date of Patent: Jan. 29, 2019

(54) METHOD OF ADAPTING A SOURCE IMAGE CONTENT TO A TARGET DISPLAY

(75) Inventors: Anders Ballestad, Vancouver (CA); Gerwin Damberg, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 644 days.

(21) Appl. No.: 14/130,488

(22) PCT Filed: Jul. 6, 2012

(86) PCT No.: PCT/US2012/045856
§ 371 (c)(1),
(2), (4) Date: Dec. 31, 2013

(87) PCT Pub. No.: WO2013/009651
PCT Pub. Date: Jan. 17, 2013

(65) Prior Publication Data
US 2014/0160143 A1  Jun. 12, 2014

Related U.S. Application Data

(60) Provisional application No. 61/506,903, filed on Jul. 12, 2011.

(51) Int. Cl.
*G09G 5/02* (2006.01)
*G06T 5/00* (2006.01)

(52) U.S. Cl.
CPC ............ *G09G 5/02* (2013.01); *G06T 5/009* (2013.01)

(58) Field of Classification Search
CPC ............ G09G 5/02; G09G 2320/0247; G09G 2340/0407; G06T 5/009;
(Continued)

(56) References Cited

U.S. PATENT DOCUMENTS

| 5,874,988 | A | * | 2/1999 | Gu ................................ 348/97 |
| 2003/0110297 | A1 | * | 6/2003 | Tabatabai .......... G06F 17/30905 709/246 |

(Continued)

FOREIGN PATENT DOCUMENTS

| CN | 1213118 | 4/1999 |
| CN | 1384464 | 12/2002 |

OTHER PUBLICATIONS

"Progressive Histogram Reshaping for Creative Color Transfer and Tone Reproduction" Proc. of the 8th International Symposium on Non-Photorealistic Animation and Rendering, 2010, pp. 81-90, published in ACM.*

(Continued)

*Primary Examiner* — Gregory J Tryder
*Assistant Examiner* — Kwang Lee

(57) ABSTRACT

Source image content is adapted to a target display. Target image content associated with the target display is provided. A histogram is computed for the target image content. A prominent feature present in the target histogram is determined. A histogram is computed for the source image content. The source content histogram is manipulated to reflect the determined target histogram prominent feature(s). Adapted source image content is generated based on the manipulated source histograms(s). Another prominent feature present in the target histogram is determined. The source histogram is further manipulated to reflect the other prominent determined target histogram features. Further adapted source image content is generated based on the further manipulated source histogram if the adapted source image content has insufficient image quality and perceptual color characteristics.

26 Claims, 1 Drawing Sheet

(58) Field of Classification Search
CPC .. G06T 2207/10024; D21C 7/06; H03G 3/20; H04L 29/06027; H04L 65/602; H04L 51/04; G06K 2209/01; G06K 7/10722; G06K 9/036; G06F 17/243; G02B 26/0841; H04N 19/136; H04N 21/25825; H04N 21/2662; H04N 21/25833; H04N 21/25891
USPC .......................................................... 345/589
See application file for complete search history.

(56) References Cited

U.S. PATENT DOCUMENTS

| | | | |
|---|---|---|---|
| 2007/0080973 | A1 | 4/2007 | Stauder |
| 2008/0089581 | A1 | 4/2008 | Pitie |
| 2008/0226168 | A1 | 9/2008 | Bae |
| 2009/0109236 | A1 | 4/2009 | Xu |
| 2009/0257652 | A1 | 10/2009 | Liu |
| 2011/0123069 | A1* | 5/2011 | Kisilev et al. ................ 382/106 |
| 2011/0316973 | A1 | 12/2011 | Miller |
| 2013/0038790 | A1 | 2/2013 | Atkins |
| 2013/0120656 | A1 | 5/2013 | Wilson |
| 2014/0002737 | A1* | 1/2014 | Damberg et al. ............. 348/488 |

OTHER PUBLICATIONS

Pitie, F. et al "Automated Colour Grading Using Colour Distribution Transfer" Elsevier, Computer Vision and Image Understanding 107 (2007) 123-137, Jan. 19, 2007.

Huang, Y.H. et al "A Practical Color Transfer Algorithm for Image Sequences" IEEE, Third International Conference on International Information Hiding and Multimedia Signal Processing, vol. 1, pp. 577-580, Nov. 26-28, 2007.

Wang, C.M. et al "A Novel Color Transfer Algorithm for Image Sequences" Journal of Information Science and Engineering, vol. 20, No. 6, pp. 1039-1056, Nov. 2004.

Pitie, F et al. "N-Dimensional Probability Density Function Transfer and its Application to Colour Transfer" IEEE International Conference on Computer Vision, Beijing China, Oct. 2, 2005, 1434-1439.

Pitie, F. et al "The Linear Monge-Kantorovitch Linear Colour Mapping for Example-Based Colour Transfer" Visual Media Production, 4th European Conference on Visual Media Production, London, UK, Nov. 27-28, 2007, p. 1-9.

Wang, C.M. et al "An Effective Algorithm for Image Sequence Color Transfer" Mathematical and Computer Modelling, vol. 44, No. 7-8, Mar. 22, 2006, pp. 608-627.

Reinhard, E. et al "Color Transfer Between Images", IEEE CG&A special issue on Applied Perception,vol. 21, No. 5, pp. 34-41, Sep.-Oct. 2001.

Pouli, T. et al "Progressive Histogram Reshaping for Creative Color Transfer and Tone Reproduction" Proc. of the 8th International Symposium on Non-Photorealistic Animation and Rendering, Annecy, France, Jun. 7-10, 2010, pp. 81-90.

Pouli, T. et al "Progressive Color Transfer for Images of Arbitrary Dynamic Range" Computers and Graphics, Elsevier, GB, vol. 35, No. 1, Nov. 5, 2010, pp. 67-80.

Pouli, Tania "Statistics of Image Categories for Computer Graphics Applications" Ph.D. Thesis submitted to the University of Bristol, Feb. 1, 2011, pp. 1-255.

"MPEG-7 Overview" Coding of Moving Pictures and Audio, International Organisation for Standardisation Organisatione Internationale de Normalisation, Palma de Mallorca, Oct. 2004, p. 26.

* cited by examiner

METHOD OF ADAPTING A SOURCE IMAGE CONTENT TO A TARGET DISPLAY

CROSS-REFERENCE OF RELATED APPLICATIONS

This application claims priority to U.S. Provisional Application No. 61/506,903 filed 12 Jul. 2011, which is hereby incorporated by reference in entirety for all purposes.

TECHNOLOGY

The invention relates to a method of adapting source image content to a target display, wherein the target display may be chosen from a variety of different display types offering different color gamuts, different luminance, brightness or contrast ranges and/or other differing specifications affecting visual perception.

BACKGROUND

Displays such as televisions, computer monitors, displays in portable devices, special purpose displays such as virtual reality displays, vehicle simulators, advertising displays, stadium displays, and the like are widespread. State of the art displays are capable of displaying fine nuances of color and tone.

A wide range of display technologies are now available. For example, there are plasma displays, LCD displays backlit by a variety of types of light sources such as LEDs of various types, fluorescent lamps or high-intensity incandescent lamps, CRT-based displays, digital cinema displays, OLED displays etc. A particular display combines display hardware with video signal processing components that receive video signals and drive display hardware to display video content of the video signals.

Different displays may vary significantly with respect to features such as:
  the color gamut that can be reproduced by the display;
  the maximum brightness achievable;
  contrast ratio;
  resolution;
  acceptable input signal formats;
  color depth;
  white level;
  black level;
  white point;
  grey steps;
etc.

Because displays can perform very differently, the same image content may appear different when viewed on different displays. Image content that is pleasing to look at when viewed on one display may be less pleasing when viewed on another display having different capabilities. Image content that matches a creator's creative intent when displayed on some displays may depart from the creator's creative intent in one or more ways when viewed on other displays.

The perception of color and luminance is also affected by ambient conditions. Video or other images presented under theater conditions (low ambient lighting) may be perceived by viewers significantly differently than the same video or other images would be perceived when viewed under conditions with significant ambient light. Further, the characteristics (such as the color temperature) of ambient light can affect a viewer's perception of video content.

The creator of a video production or other image may set tones and colors of pixels in the image so that, when viewed, the image has a desired appearance which agrees with the creator's creative intent. For example, a creator may wish some scenes to have a darker, more oppressive, feel than others. The creator may wish certain features depicted in a scene to stand out or to be less prominent. The creator may wish to have colors seem extra vivid in some scenes and more muted in others. Adjusting tones and colors of pixels in an image may include performing color grading (or 'color timing') on the source video data. Color grading may be performed using a hardware/software system that permits a user to change the video data in various ways to achieve a desired appearance. Color grading of an entire sequence of image frames or video therefore generally is a lengthy and costly process.

Since the choice of display on which content is viewed and the ambient lighting conditions at the time the content is viewed can affect viewers' perceptions of the content being viewed, it would be ideal to have the creator perform color grading separately for every display on which the video production might be viewed and for all ambient conditions under which the video production might be viewed. Viewers could then obtain customized versions of the production optimized for viewing on their displays and ambient conditions. This is generally impractical.

Commonly owned U.S. patent application No. 61/307,547 filed on 24 Feb. 2010 and entitled DISPLAY MANAGEMENT METHODS AND APPARATUS and No. 61/366,899 entitled DISPLAY MANAGEMENT SERVER and No. 61/364,693 filed on 10 Jul. 2010 and entitled DISPLAY MANAGEMENT METHODS AND APPARATUS describe generating video content having colors and tones suitable for display on a particular display by interpolating or extrapolating between different version of the video content that have been prepared for viewing on other displays. Further commonly owned U.S. patent applications No. 61/453,924 filed on 17 Mar. 2011 and entitled GENERATING ALTERNATIVE VERSIONS OF IMAGE CONTENT USING HISTOGRAMS as well as No. 61/453,922 filed on 17 Mar. 2011 and entitled ENCODING AND DECODING ALTERNATIVE VERSIONS OF IMAGE CONTENT USING HISTOGRAMS describe various applications of a progressive histogram matching algorithm to match the visual perception of at least one source image to the desired visual perception of at least one target image. These applications are hereby incorporated herein by reference for all purposes in their entirety.

For example, a source image may be color graded for viewing on a REC 709 display and another source image may be color graded for viewing on a VDR display. So usually the visual perception of such source images will differ widely when viewed on the same target display. If the target display is neither one of the target displays to which said source images have been specifically adapted, both source images' on screen appearance will usually not cause excitement. Furthermore, the intended creative impression to be conveyed by the source images' appearance on screen might be totally lost or at least considerably reduced.

Rec 709 is a video data format specified by ITU-R Recommendation BT.709, which is hereby incorporated herein by reference. Visual Dynamic Range (VDR) is a format capable of representing an extremely broad range of colors and tones. VDR is described, for example, in co-owned PCT Application No. PCT/US2010/022700 entitled EXTENDED DYNAMIC RANGE AND EXTENDED DIMENSIONALITY IMAGE SIGNAL CONVERSION AND/OR DELIVERY VIA LEGACY VIDEO INTER- FACES which is hereby incorporated herein by reference for all purposes. The VDR format can encode the full range of human vision.

There is a need for efficient ways to achieve a satisfying viewing quality on one or more specific target displays while still preserving the original creative intent embodied in e.g. the coloring of the image content to be viewed. Approaches that have been used to achieve the same are described in the references listed in this Background section, below.

Pitié et al. "*Automated colour grading using colour distribution transfer,*" Computer Vision and Image Understanding, 107(1-2):123-137, 2007 as well as Pitié et al., "*N-dimensional probability density function transfer and its application to colour transfer,*" IEEE International Conference on Computer Vision (ICCV'05), Beijing, China, 17-21 October, 2, 2005, 1434, 1439 focus largely on full color transfer, which works for images that may differ significantly from each other in a spatial sense and/or in a sense that relates to brightness and color.

Reinhard et al., "*Color Transfer between Images*" (*IEEE CG&A special issue on Applied perception*, Vol 21, No 5, pp 34-41, September-October 2001 as well as Pouli et al., "*Progressive Histogram Reshaping for Creative Color Transfer and Tone Reproduction*" (*Proceedings of the ACM Symposium on Non-Photorealistic Animation and Rendering, Annecy*, France, June 7-10, pp. 81-90, 2010) describe basic algorithms to transfer the "mood" or "intent" of one image to another while not altering its structure. Hereby, the Pouli et al. reference specifically teaches progressive histogram matching methods to partially match a source to a target image. In chapters 3 and 4 (entitled "Progressive Histogram Reshaping", respectively "Creative Tone Reproduction") the algorithm is laid out in detail. Such chapters 3 and 4 shall be explicitly incorporated herein by reference in their entirety. In a later paper, Pouli et al. present a further elaborated amended version: "*Progressive color transfer for images of arbitrary dynamic range*", Computer & Graphics 35 (2011) 67-80 of such method. In chapters 3, 4 and 5 (entitled "Algorithm", "Region Selection" respectively "Creative tone reproduction") on pages 69 up to 76, the method is outlined in detail. Such chapters 3-5 shall be explicitly incorporated herein by reference in their entirety.

SUMMARY

The present invention discloses inventive and useful applications of basic algorithms such as those cited in the Background section, above.

While manual color adjustments may be preferred over (fully) automated approaches for minor adjustments or only a few frames, producing more versions (target images)—e.g. for different use cases—will become a lengthy and costly manual process.

Embodiments may assist the artist/director/producer in efficiently color grading image and/or video content.

Embodiments may adapt source image content to a target display, wherein the target display may be chosen from a variety of different display types offering different color gamuts and/or other differing specifications affecting visual perception. At the same time, the adapted source image content shall also be perceived by an audience as intended by the creator of the image content when viewed on the target display. It is therefore highly desirable to have a method balancing both of those different requirements to result in a good comprise.

Embodiments may speed up known color grading methods by suggesting an at least partially automated process while still providing efficient means to influence the results by a user.

Embodiments may facilitate encoding of images processed according to the invention.

An example embodiment relates to a process for adapting a source image content to a target display. The process comprises:

providing a target image content associated with the target display;

calculating at least one target histogram for the target image content;

determining one or more prominent features present in the target histogram;

calculating at least one source histogram for the source image content;

manipulating the at least one source histogram to reflect the one or more prominent features determined for the target histogram;

generating an adapted source image content based on the manipulated at least one source histogram; and determining further one or more prominent features present in the target histogram as well as further manipulating the at least one source histogram to reflect the further one or more prominent features determined for the target histogram and generating a further adapted source image content based on the further manipulated at least one source histogram, if the adapted source image content does not correspond to both an image quality requirement associated with the target display and an image color perception requirement associated with the target image content.

An example embodiment relates to a computer system that is programmable or controllable for performing related processes. An example embodiment relates to a non-transitory computer readable storage medium comprising encoded instructions tangibly stored therewith such as a hard drive, a memory device, an optically, magnetically, electrically, electronically, electromagnetically, encoded disk such as BluRay, DVD, CD, CD-ROM, solid-state drive, or similar products or media, which when executing with a processor of the computer, cause, controls or performs a related process.

The image quality requirement might be a technical specification such as a standard—or may be at least based thereon—demanding specific target properties from the adapted source image to result in an optimized image quality of the adapted source image when displayed on the target display.

Also, the image quality requirement might include human judgment. For example, the creator of a movie wants his work to be optimized for viewing on the target display. She or he has the adapted source image(s) (e.g. one or more frames of a movie sequence) displayed on the target display. Then s/he decides if s/he is already happy with the result (image quality requirement fulfilled) or not (image quality requirement not yet fulfilled).

The image color perception requirement is an additional requirement which needs to be met in parallel, i.e. at the same time. Said image color perception requirement is associated with the target image content. In other words, the adapted source image shall exhibit coloring similar to the coloring of the target image. As coloring carries e.g. the mood of a movie scene and/or emphasizes specific aspects like weather conditions, time of the day and the like, it is an important factor in influencing the impressions of an audience while watching e.g. a movie. As opposed to known methods of manual color grading using special image processing software (like for example Adobe's Photoshop), the present invention employs the target image content to introduce the coloring to be at least partially transferred onto the source image: The target image content carries the "mood" etc. which shall be reflected in the adapted respectively further adapted source image. Another object as to the utility of the target image content can be found in the desire to induce the "look and feel" of an earlier movie (scene) into a later produced movie (scene). Yet another utility of such target image content is to contribute to actively shaping the audience's perception of the source image content. This might include serially executing the method according to the invention by employing a first and then a second target image content to be serially transferred onto the source image with regard to their coloring using for example a progressive histogram shaping method as outlined before. Such serial conversion therefore might include several target image contents if the initially obtained partially matched source image content does not yet meet the desired "look and feel". In such manner, one may for example obtain source image(s) adapted to look like "30% Steven Spielberg with a 70% stark contrast-look".

Usually, the color perception requirement will be a subjective requirement the fulfillment of which will be judged by a human such like the creator of a movie. However, said color perception requirement may also include a technical specification including e.g. at least one target histogram, thus allowing for a further automated method.

The method and preferred embodiments according to the invention provide for balancing both requirements (i.e. image quality on target display vs. intended color perception) to result in a compromise: The adapted respectively further adapted source image will look good on the target display while also carrying "the mood" transferred from the target image content's coloring information etc. The invention thus aims at generating one or more partially matched source images as the best-as-it-can-get compromise for both preserving the "look and feel" of the target image content while maximizing adaption of the (partially matched) source image to the particular target display.

It is possibly to achieve this balance in an efficient way, because the method according to the invention only gradually transfers target image content information onto the source image starting with the prominent features exhibited by the target histogram ("partial match"). This might include computing (by downsampling) a number of scales for the target histogram (from coarse to fine) and determining prominent features for each scale. The method then starts using the coarsest scale of the target histogram first. In such initial steps, you only transfer some of the coloring information (carried by said prominent features of the target image content and e.g. relating to low frequency content of the target histogram) onto the source image—and this might already be a satisfactory compromise to achieve both good image quality on the target display and an intended image color perception, without introducing significant distortion like artifacts into the source image content. If both requirements are not yet sufficiently balanced, one might turn to a next series of steps using a finer scale of the target histogram (e.g. relating to higher frequency content of the target histogram) such that further prominent features of the target image content will be transferred onto the source image content—and the result checked again for fulfillment of both requirements.

In a preferred embodiment, the one or more prominent features determined for the target histogram are associated with at least one low frequency content of the target histogram. Also, the further one or more prominent features determined for the target histogram can be associated with at least one high frequency content of the target histogram. This may be accomplished e.g. by downsampling the target histogram to result in one or more scales of the histogram. The "higher" the downsampling rate applied, the lower the frequencies covered by—respectively remaining in—the downsampled histogram. Low respectively high frequency content of the histrogram may be obtained by low-pass respectively high-pass filtering of the histogram. Such approach allows for gradually matching the source histogram to the target histogram by subsequently adapting the source histogram to a current scale of the target histogram. Therefore, the method according to the invention preferably employs progressive histogram matching techniques to allow for a sequence of adaptions to the source image content to include more and more prominent features of the target histogram in each adaption step.

It has been determined in front end and experimental use that such partial match of the source histogram to the target histogram will often result in a much better compromise regarding balancing the image quality and color perception requirements as compared to having a complete match of the source histogram to the target histogram in one cycle which often causes distortion like artifacts (at least in some source image regions of the adapted source image), requiring a subsequent clean up step.

Furthermore, despite reflecting a good reproduction of the target image's "look and feel" in the adapted source image when applying a complete match in one cycle, it can hardly be assured that the adapted source image will at the same time exhibit sufficient image quality when displayed on the target display. The proposed method according to the invention proves to be superior as each progressive histogram matching step can be judged individually against the fulfillment of both requirements. So chances are significantly increased to economically produce a well-matched source image.

If the target image has been chosen in advance to be already adapted to image quality capabilities associated with the target display, this will further support meeting the invention's objectives economically.

In yet another preferred embodiment, manipulating the at least one source histogram includes matching at least one region of the source histogram to at least one corresponding region of the target histogram.

Such embodiment provides for selectively choosing the regions to be matched, thus allowing for even greater flexibility as to the desired degree of matching. Here, it is particularly advantageous if matching the at least one region of the source histogram to the at least one corresponding region of the target histogram includes matching the mean and/or standard deviation associated with the at least one region of the source histogram to the corresponding mean and/or standard deviation associated with the corresponding at least one region of the target histogram. The mean and/or standard deviation are important statistical characteristics representing prominent features to be transferred from the target to the source histogram.

To increase flexibility when matching the mean and/or standard deviation associated with the at least one region of the source histogram to the corresponding mean and/or standard deviation associated with the corresponding at least one region of the target histogram, a weighting factor can be applied to said mean and/or standard deviation.

The weighting factor can be chosen to further emphasize the prominent features to be transferred, or even to reduce their impact. A person skilled in the art will be able to perform e.g. a limited series of experiments to deliver a prescription on how to shape the weighting factor for a specific application.

In some applications, one might wish to transmit the source image content to a remote location, e.g. via a TV network, to be displayed at a target display located at the remote location. Here, it is advantageous to encode the manipulated at least one source histogram as metadata associated with the source image content, preferably using MPEG for encoding the source image content, wherein the metadata are included in the MPEG encoded source image content. This need may arise for example when source image content to be transmitted comprises at least one frame of video content.

The method according to the invention can be extended for application on separate color channels associated with the target and/or source image content. In such embodiment, the at least one target respectively source histogram includes a number of target respectively source histograms related to a plurality of color channels.

Results proved to be very promising when manipulating the at least one source histogram to reflect the one or more prominent features determined for the target histogram includes performing a progressive histogram matching algorithm. The same is true for further manipulating the at least one source histogram. Useful progressive histogram matching algorithms for use with the present invention can be found for example in Pouli et al., "*Progressive Histogram Reshaping for Creative Color Transfer and Tone Reproduction*" (*Proceedings of the ACM Symposium on Non-Photorealistic Animation and Rendering*, Annecy, France, June 7-10, pp. 81-90, 2010) as well as in Pouli et al. "*Progressive color transfer for images of arbitrary dynamic range*", *Computer & Graphics* 35 (2011) 67-80 (see also PRIOR ART section above). Those references shall herewith be included by reference specifically for providing an enabling disclosure to a person skilled in the art. Also, various adaptions and variations of such algorithms may be readily developed by a person skilled in the art to be used with the present invention. Therefore, the present invention shall not be construed to be limited to the application of those algorithms specifically referred to herein.

Said manipulations may again be separately applied to a number of color channels associated with the target histogram including a number of target histograms related to a number of target color channels such that a histogram matching algorithm is applied separately to each color channel associated with the source image content.

The method according to the invention can furthermore be repeatedly applied until both the image quality requirement associated with the target display and the image color perception requirement associated with the target image content are fulfilled. Such preferred embodiment makes provision for achieving better results using a series of histogram matching cycles. If the target histogram is replaced by a further target histogram associated with a further target image content in at least one of said repetitions, it is even possible to transfer the "look and feel" of more than one target image content onto the source image content, resulting in a blend of target "looks and feels" reflected in the manipulated source image content.

BRIEF DESCRIPTION OF THE DRAWINGS

The invention is described and explained in more detail below on the basis of the exemplary embodiment shown in the figures.

The figures show.

DESCRIPTION OF EXAMPLE EMBODIMENTS

Figure 1:
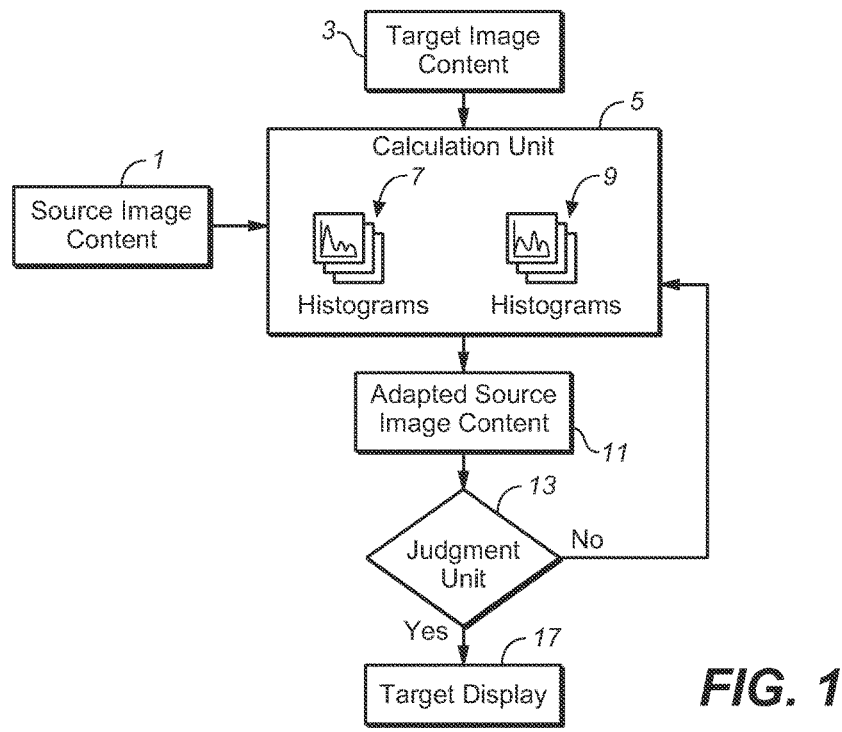
FIG. 1 a method of adapting a source image content according to the invention.

FIG. 1 schematically depicts a method of adapting a source image content according to the invention. A target image content 3 and a source image content 1 are provided. The target image content 3 includes for example one or more frames selected from video content. The target image content 3 represents the "look and feel" to be transferred onto the source image content 1.

The proposed method essentially involves manipulating a source histogram 9 calculated for the source image content 1 on the basis of prominent features determined from a target histogram 9 calculated for the target image content 3.

A calculation unit 5 is provided for calculating and manipulating said histograms 7, 9 resulting in adapted source image content 11 obtained by applying the at least one manipulated source histogram to the source image content 11. In that context, prominent features may include low frequency content of the target histogram, as well as increasingly higher frequency content after each repetition of the method. Accordingly, each repetition of the method delivers partially matched source image content including more and more prominent features associated with the target image content after each repetition until the intended "look and feel"—represented by the target image content—has been transferred onto the source image content to a satisfactory degree.

A judgment unit 13—which may include or human judgment—is provided for determining if the adapted source image content 11 fulfills both requirements regarding an image quality requirement associated with a target display 17 and an image color perception requirement associated with the target image content 3. If it does already—as judged by the judgment unit 13—, the adapted source image content 11 will exhibit good image quality when viewed on the target display 17 while also carrying the "look and feel" of the target image content 3. In case both requirements are not yet sufficiently fulfilled, the method will again be invoked to determine further prominent features for the target histogram and transfer those onto the (already adapted) source image content.

Increasingly refined prominent features can be determined for example by providing a number of scales of the target histogram (from coarse to fine) obtained by downsampling the target histogram. The overall method provides for reaching a good compromise as to image quality on the target screen and creative color perception intent as represented by the target image content.

As outlined earlier, adapting the source image content by manipulating the source histogram preferably includes a progressive histogram matching algorithm as exemplary referred to in earlier sections. Transferring prominent features preferably includes matching a mean and/or standard deviation associated with at least one region of the source histogram to a corresponding mean and/or standard deviation associated with a corresponding at least one region of the target histogram. If such algorithm further includes a scalable weighting factor to be applied to said mean and/or standard deviation, further flexibility and quality control will be introduced.

Figure 2:
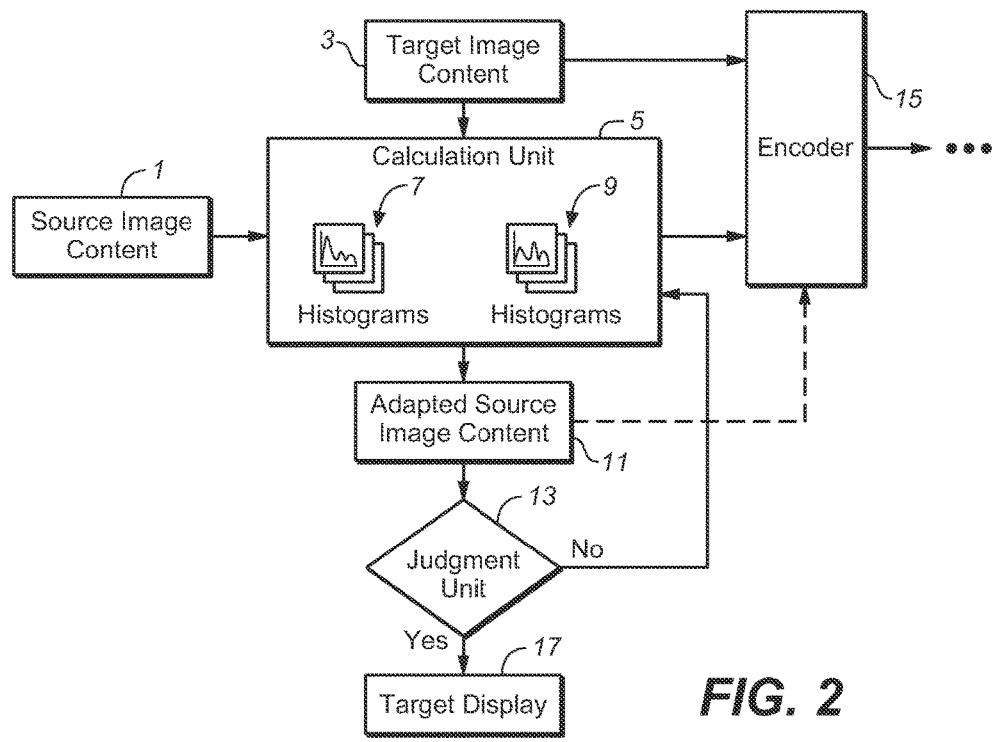
FIG. 2 a further elaborated method including manipulating separate color channels and encoding.

FIG. 2 includes the basic outline of the method as depicted in FIG. 1; corresponding elements will therefore have the same numerals as in FIG. 1, exhibiting basically the same functionality.

In FIG. 2, we have included an encoder 15, e.g. employing MPEG encoding, to prepare the source image content 3 for transmission to a remote location. Furthermore, source histogram 9 and target histogram 7 each include a number of histograms related to separate color channels associated with the source respectively target image content. Consequently, manipulating the source histogram 9 here includes manipulating each of the individual source histograms associated with said color channels by employing e.g. a progressive histogram matching algorithm to each individual source histogram.

The manipulated source histogram 7 (including said manipulated individual source histograms related to said color channels) is included as metadata to be transmitted with the encoded source image content 3. At the remote location, the source image content 3 can be restored from the encoded source image content using an appropriate decoder (not shown here). As the metadata—including the manipulated source histogram—are also transmitted, the restored source image content 3 can easily be converted into the adapted source image content 11 at the remote location, thus adapting it to a target-display type of screen at the remote location. If a different type of screen were present, the metadata may simply be ignored or further processed.

Alternatively, the already adapted source image content 11 on the encoder side might be encoded and transmitted (as indicated by the dotted line in FIG. 2), in addition to said metadata or omitting the metadata. If the metadata will also be transmitted, they can be further processed on the decoder side e.g. for further adaption of the already adapted, encoded and transmitted source image content to the specific type of display present on the decoder side.

Embodiments of the present invention relate to generating partially matched source image content as the best-as-it-can-get compromise for both preserving the "look and feel" of the target image content while also maximizing adaption of the source image content to a particular target display.

A serial conversion might be employed using several target image contents if the initially obtained partially matched source image content does not yet meet the desired target "look and feel"—while keeping in mind the before-mentioned image quality requirement.

User parameters to control the amount of reshaping of the source image content's histogram may include:

The number of scales related to the target histogram to be used, and

Weighting parameters applied to the mean and standard deviation of the respective histograms.

Embodiments allow effective color grading applications, making use of a progressive histogram matching algorithm. This allows e.g. the colorist of a movie for partially transferring the look of one or more frames—usually of a distinct movie—s/he likes onto one or more frames—or even all frames—of the movie s/he is currently working on. In simple words, s/he might e.g. apply "10% of the Matrix movie look" to the movie s/he is currently coloring. In a subsequent step, s/he might decide to follow up with applying "40% of the Casablanca movie look".

Consequently, one focus of the current invention is to provide a method of color grading for partially transferring the coloring of a source image to a target image.

It also makes provision for sequentially applying such partial color transfer algorithm by choosing different source images for each sequence. By contrast, conventional color grading usually aims at a complete color match between the source and the target image.

The principle steps of Reinhard et al. respectively Pouli et al. (see Background and sections) disclosed progressive histogram matching methods include:

(i) Computing (i.e. by downsampling) a number of scales for the target histogram (from coarse to fine). The motivation here is to remove high frequency details from the target histogram while preserving prominent features represented by lower frequency details.

(ii) Detecting features present in the respectively each current scale of the target histogram by determining its minima and maxima.

(iii) Dividing the respectively each current scale of the target histogram into a set of regions spanned by said determined minima and maxima.

(iv) Dividing the source histogram into corresponding regions.

(v) Computing mean and standard deviation for each region of the source histogram.

(vi) Computing mean and standard deviation for each region of the target histogram.

(vii) Matching all bins in each region of the source image to the corresponding bins in the corresponding region of the target image regarding means and standard deviations.

(viii) Reversing the roles of source and target histograms. The motivation here is to correct re-shaping and alignment of even significantly different histograms:

(ix) Determining minima and maxima of the matched source image.

(x) Dividing the matched source histogram into a set of regions spanned by said minima and maxima (from ix).

(xi) Dividing the target histogram into corresponding regions (from x).

(xii) Computing mean and standard deviation for each region of the matched source histogram.

(xiii) Computing mean and standard deviation for each region of the target histogram.

(xiv) Matching all bins in each region of the matched source image to the corresponding bins in the corresponding region of the target image regarding means and standard deviations.

(xv) If necessary/desirable, proceed accordingly (i.e. repeat ii-xiv) with next (finer) target histogram scale using updated (matched) source histogram from step xiv for subsequent (finer) matches.

We claim:

1. A method for adapting a source image content to a target display from a plurality of different display types offering differing specifications affecting visual perception, the method comprising:

providing a target image content associated with the target display; wherein the target image content comprises one or more frames of video content representing a "look and feel" to be transferred onto the source image content;

calculating at least one target histogram for the target image content;

determining one or more prominent features present in the target histogram;

calculating at least one source histogram for the source image content;

manipulating the at least one source histogram to reflect the one or more prominent features determined for the target histogram;

generating an adapted source image content based on the manipulated at least one source histogram;

determining whether the adapted source image content corresponds to both an image quality requirement associated with the target display and an image color perception requirement associated with the target image content; and determining further one or more prominent features present in the target histogram as well as further manipulating the at least one source histogram to reflect the further one or more prominent features determined for the target histogram and generating a further adapted source image content based on the further manipulated at least one source histogram, if the adapted source image content does not correspond to both the image quality requirement associated with the target display and the image color perception requirement associated with the target image content; and wherein the image quality requirement requires specific target properties from the adapted source image content when displayed on the target display; and a compromise is achieved between the image quality requirement associated with the target display and the image color perception requirement associated with the target image content.

2. The method according to claim 1, wherein the one or more prominent features determined for the target histogram are associated with at least one low frequency content of the target histogram.

3. The method according to claim 2, wherein the further one or more prominent features determined for the target histogram are associated with at least one high frequency content of the target histogram.

4. The method according to claim 1, wherein manipulating the at least one source histogram includes matching at least one region of the source histogram to at least one corresponding region of the target histogram.

5. The method according to claim 4, wherein matching the at least one region of the source histogram to the at least one corresponding region of the target histogram includes matching a mean and/or standard deviation associated with the at least one region of the source histogram to a corresponding mean and/or standard deviation associated with the corresponding at least one region of the target histogram.

6. The method according to claim 5, wherein matching the mean and/or standard deviation associated with the at least one region of the source histogram to the corresponding mean and/or standard deviation associated with the corresponding at least one region of the target histogram includes application of a weighting factor to said mean and/or standard deviation.

7. The method according to claim 1, wherein the source image content comprises at least one frame of video content.

8. The method according to claim 1, further comprising encoding the manipulated at least one source histogram as metadata associated with the source image content.

9. The method according to claim 8, further comprising MPEG encoding the source image content, wherein the metadata are included in the MPEG encoded source image content.

10. The method according to claim 1, wherein the at least one target histogram includes a number of target histograms related to a plurality of target color channels.

11. The method according to claim 1, wherein the at least one source histogram includes a number of source histograms related to a plurality of source color channels.

12. The method according to claim 1, wherein manipulating the at least one source histogram to reflect the one or more prominent features determined for the target histogram includes performing a progressive histogram matching algorithm.

13. The method according to claim 1, wherein further manipulating the at least one source histogram to reflect the further one or more prominent features determined for the target histogram includes performing a progressive histogram matching algorithm.

14. The method according to claim 13, wherein
the target histogram includes a number of target histograms associated with a number of target color channels, and
the histogram matching algorithm is applied separately to a number of color channels associated with the source image content.

15. The method according to claim 1, wherein said method is repeatedly applied until both the image quality requirement associated with the target display and the image color perception requirement associated with the target image content are fulfilled.

16. The method according to claim 15, wherein the target histogram is replaced by a further target histogram associated with a further target image content in at least one of said repetitions.

17. The method according to claim 1, wherein the image quality requirement and the image color perception requirement comprise a technical specification.

18. The method according to claim 1, wherein each progressive further adapted source image content is judged individually against the fulfillment of both the image quality requirement associated with the target display and the image color perception requirement associated with the target image content.

19. A non-transitory computer readable storage medium comprising encoded instructions tangibly stored therewith, which when executing with a processor of the computer, cause, controls or performs a process comprising the steps of:

providing a target image content associated with the target display; wherein the target image content comprises one or more frames of video content representing a "look and feel" to be transferred onto the source image content;

calculating at least one target histogram for the target image content;

determining one or more prominent features present in the target histogram;

calculating at least one source histogram for the source image content;

manipulating the at least one source histogram to reflect the one or more prominent features determined for the target histogram;

generating an adapted source image content based on the manipulated at least one source histogram;

determining whether the adapted source image content corresponds to both an image quality requirement associated with the target display and an image color perception requirement associated with the target image content; and determining further one or more prominent features present in the target histogram as well as further manipulating the at least one source histogram to reflect the further one or more prominent features determined for the target histogram and generating a further adapted source image content based on the further manipulated at least one source histogram, if the adapted source image content does not correspond to both the image quality requirement associated with the target display and the image color perception requirement associated with the target image content; and wherein the image quality requirement requires specific target properties from the adapted source image content when displayed on the target display; and a compromise is achieved between the image quality requirement associated with the target display and the image color perception requirement associated with the target image content.

20. The non-transitory computer readable storage medium according to claim 19, wherein the image quality requirement and the image color perception requirement comprise a technical specification.

21. The non-transitory computer readable storage medium according to claim 19, wherein each progressive further adapted source image content is judged individually against the fulfillment of both the image quality requirement associated with the target display and the image color perception requirement associated with the target image content.

22. An adapter, comprising:

a target selector that identifies target image content associated with a target display, the target image content comprising one or more frames of video content representing a "look and feel" to be transferred onto a source image content;

a calculator that calculates at least one target histogram for the target image content;

a feature identifier that determines one or more prominent features present in the target histogram;

the calculator further calculates at least one source histogram for the source image content;

a manipulator device that manipulates the at least one source histogram to reflect the one or more prominent features determined for the target histogram;

a generator that generates an adapted source image content based on the manipulated at least one source histogram;

a judgment unit operative to determine whether the adapted source image content does not correspond to both an image quality requirement associated with the target display and an image color perception requirement associated with the target image content; and the feature identifier further determines one or more prominent features present in the target histogram as well as further manipulates the at least one source histogram to reflect the further one or more prominent features determined for the target histogram and generates a further adapted source image content based on the further manipulated at least one source histogram, if the adapted source image content does not correspond to both the image quality requirement associated with the target display and the image color perception requirement associated with the target image content; and wherein the image quality requirement requires specific target properties from the adapted source image content when displayed on the target display; and a compromise is achieved between the image quality requirement associated with the target display and the image color perception requirement associated with the target image content.

23. The adapter according to claim 22, wherein the adapter is installed in a consumer electronics device.

24. The adapter according to claim 22, wherein the adapter is connected to a display.

25. The adapter according to claim 22, wherein the image quality requirement and the image color perception requirement comprise a technical specification.

26. The adapter according to claim 22, wherein each progressive further adapted source image content is judged individually against the fulfillment of both the image quality requirement associated with the target display and the image color perception requirement associated with the target image content.

* * * * *